United States Patent [19]

Moore

[11] Patent Number: 5,135,974
[45] Date of Patent: Aug. 4, 1992

[54] CYANURATE BASED FIRE RETARDANT CONCENTRATES

[75] Inventor: William P. Moore, Hopewell, Va.

[73] Assignee: FR Polymers, Inc., Disputanta, Va.

[21] Appl. No.: 763,530

[22] Filed: Sep. 23, 1991

[51] Int. Cl.$^5$ .......................... C08J 5/10; C08K 5/34; C08L 23/36
[52] U.S. Cl. ....................................... 524/101; 524/86
[58] Field of Search ................................... 524/86, 101

[56] References Cited

U.S. PATENT DOCUMENTS

| | | | |
|---|---|---|---|
| 3,660,344 | 5/1972 | Dietrich et al. | 260/37 N |
| 4,001,177 | 1/1977 | Tsutsami | 260/45.8 NT |
| 4,317,766 | 3/1982 | Kawasaki et al. | 524/101 |
| 4,363,890 | 12/1982 | Oshita et al. | 524/101 |

*Primary Examiner*—Kriellion S. Morgan
*Assistant Examiner*—U. K. Rajguru

[57] ABSTRACT

A method of preparing fire retardant concentrates wherein a base soluble cyanurate is dissolved in base and mixed with a fluid thermoplastic polymer. An amino-s-triazine is then reacted in-situ with the solubulized cyanurate to precipitate very fine insoluble cyanurate-amino-s-triazine adduct evenly distributed in the polymer. The mixture is cooled below its solidification point, binding the film particles of the insoluble adduct together by a matrix of solid thermoplastic polymer. The solidified matrix bound adduct is comminuted to form particulate thermoplastic fire retardant concentrate. The fluid thermplastic polymer may be a melt or an aqueous dispersion of a stable polymer such as nylon, polyolefin, polycarbonate, polyester, polystyrene, and polybutadiene. The particulate granules may contain concentrations as high as 65 to 95 percent of the adducts produced from soluble cyanurates such as sodium isocyanurate, and base solubulized isocyanuric acid and chlorocyanuric acid. Effective amino-s-triazines include melamine, melamine phosphate, and methylol melamine.

16 Claims, No Drawings

CYANURATE BASED FIRE RETARDANT CONCENTRATES

CROSS REFERENCES TO RELATED APPLICATIONS

This invention is related to my copending U.S. Patent application entitled Fire Retardant Granules For Thermoplastic Polymers filed herewith.

FIELD OF THE INVENTION

The present invention is directed to the field of fire retardant thermoplastics. It is directed more particularly to a method of preparing concentrated fire retardants by reacting base soluble cyanurates with amino-s-triazines in a fluid thermoplastic polymer, thereby precipitating a high concentration of finely divided insoluble adduct throughout the fluid thermoplastic polymer, which is solidified, thereby binding the finely divided adduct together in a matrix of solid polymer. The solid matrix is comminuted to form a particulate fire retardant containing higher concentrations of effective fire retardants than possible by methods of the prior art. The present invention provides an improved and practical method of preparing the fine and insoluble fire retardant concentrates required for effective fire retardancy in thermoplastics, and provides an improved delivery system for the introduction of fire retardancy into other thermoplastics by melt blending therewith.

BACKGROUND OF THE INVENTION

It is known that the flammability of polymers and plastics can be reduced by the addition of fire retarding substances. It is also known that triazines, and triazine compounds, such as melamine cyanurates and melamine, are fire retarding substances.

Dietrich et al in U.S. Pat. No. 3,660,344 disclosed a self-extinguishing polyamide moulding composition comprising a polyamide containing between 0.5 and 25 percent melamine, or melamine derivatives.

This concept was expanded upon in U.S. Pat. No. 4,001,177 by Tsutsami who disclosed a flame retarding polyamide composition containing between 3 and 40 percent melamine, and between 0.5 and 20 percent cyanuric acid, isocyanuric acid, or similar cyanurates. The cyanurates were said to improve the distribution of melamine within the polyamide.

The flame retardancy technique with triazines was again advanced by Ohshita and Tsutsami in U.S. Pat. Nos. 4,321,189 and 4,363,890, disclosing a flame retardant polyamide molding resin containing melamine cyanurate finely dispersed therein, and the process for its preparation. In their teachings it was necessary that the average crystal size of the melamine cyanurate finely dispersed in the polyamide be less than 250 angstroms, or 0.0250 micron. To achieve the extremely fine melamine cyanurate, Ohshita and Tsutsami separately melt blended melamine and cyanuric acid with polyamide and then melt blended both polyamide blends with each other thereby producing melamine cyanurate. In an alternate preparation method, they melt blended equimolar amounts of melamine and cyanuric acid in polyamide containing between 1 and 30 percent water. Although melamine cyanurate in polyamide prepared by Ohshita and Tsutsami was effective as a fire retardant in relatively low concentrations of melamine cyanurate, the extremely high surface area and low bulk density makes molten polyamides containing useful amounts of melamine cyanurate extremely viscous and limits the amount of melamine cyanurates which can be effectively used to a maximum of about 30 percent. Higher concentrations downgrade the mechanical properties of the polyamides.

Kawasaki et.al. in U.S. Pat. No. 4,317,766 prepared flame retarding melamine cyanurate with particle sizes of about 10 microns in a more difficult manner by putting the melamine and cyanuric acid in the monomer mixture and them polymerizing to form polyamides. Although they were able to use the more reasonable sized particles of about 10 microns, they were still limited to between 2 and 25 percent melamine cyanurate concentrations. Kawasaki et.al. point out that the addition of cyanuric acid in aqueous solution is not practical because of its very low water solubility in water.

Although the prior art has provided teachings on the use of triazine compounds, particularly melamine and melamine cyanurate as fire retardants in polyamide resins, little information has been provided which would lead to a highly desirable, and much needed, cyanurate adduct fire retardant concentrate for providing fire retardancy to thermoplastic polymers by easy melt blending therewith. Also, no effective method for the preparation of such a concentrate has been provided or suggested.

The development of such a concentrate has been prevented by the inability to produce good physical properties in a resin based concentrate containing more than 25 to 40 percent cyanurate based fire retardant. This inability stems from the fact that solid particles are difficult to blend with thermoplastic polymers, and from the low solubilities of the cyanurates used in the prior art. These low solubilities have precluded use of any simple and economical cyanurates.

Thus, it has not been possible heretofore to precipitate extremely insoluble, fine, and dense cyanurate adducts homogeneously into fluid polymers in concentrated form from solution.

Direct introduction of fire retarding powders of melamine cyanurate, or other adducts, directly into fire retarding thermoplastic polymers by means of a mixing device such as a twin screw melt blender causes heavier wear on the blending device than particles of thermoplastic polymers, and more importantly requires a higher concentration of fire retardant because complete homogeneity is not achieved. The lack of homogeneity also seriously detracts from the physical properties of the polymer.

The prior art has brought forward no method for achieving the ultimate in integration of cyanurate adducts into thermoplastic fire retardant concentrates by using soluble cyanuric acids or cyanurates to achieve miscibility before precipitation as completely insoluble triazine cyanurate adducts to produce high concentrations of non-bleeding fire retardant in thermoplastic resins.

OBJECTS OF THE INVENTION

A primary object of the invention is to overcome the problems encountered in the prior art by providing a particulate, soluble cyanurate based, fire retardant concentrate, for effective blending with thermoplastic polymers to impart improved fire retardancy thereto.

A further primary object of the invention is to provide a fire retardant concentrate containing concentrations of cyanurate adducts substantially higher than heretofore possible.

A further primary object of the invention is to provide cyanurate adduct materials which are effective fire retardant agents and the materials from which they may be effectively prepared.

A further primary object of the invention is to provide methods by which the fire retardant concentrates may be efficiently and economically prepared.

A further primary object of the invention is to provide effective methods of producing fire retardant thermoplastic polymers by admixing the fire retardant concentrates with thermoplastic polymers.

SUMMARY OF THE INVENTION

The present invention provides a new soluble cyanurate based fire retardant concentrate which may be effectively blended with thermoplastic polymers to impart fire retardancy thereto. This new fire retardant concentrate contains substantially higher contents of cyanurate adducts than heretofore possible. The present invention provides a method for preparation of the concentrate and for its use in producing economical thermoplastic polymers and plastics by melt blending.

The present invention allows the effective and economical use of low toxicity, highly fire retardant cyanurate-amino-s-triazine adducts in the form of highly concentrated granules, which heretofore has not been possible because of the poor physical properties obtained when high concentrations of the adducts were used. The complicated and difficult methods of combining amino-s-triazines and cyanurates in very finely divided forms which caused the poor properties of the prior art, are ameliorated by the simple solution method provided in the present invention.

It was discovered that base soluble cyanurates mixed with solubulizing amounts of base in a fluid thermoplastic polymer could be reacted with amino-s-triazines to form insoluble adducts evenly dispersed in high concentrations within a matrix of thermoplastic polymer which retained good thermoplastic physical properties, were effective fire retardants, and easily melt blended with other thermoplastic polymers to make them fire retardant.

It was surprising that cyanurate-amino-s-triazine adduct contents could be increased to 80 percent, and higher, of the thermoplastic granules, and still retain excellent physical properties, fire retardancy effectiveness, and improved miscibility with other thermoplastic polymers and plastics to impart fire retardancy thereto.

DESCRIPTION OF PRESENTLY PREFERRED EMBODIMENTS

More specifically, I have discovered an improved method of preparing particulate, cyanurate based, fire retardant concentrates, for providing fire retardancy to thermoplastic polymers and plastics by melt blending therewith. In this method, a base soluble cyanurate, combined with sufficient base to solubulize the cyanurate, is mixed with a fluid thermoplastic polymer at a temperature exceeding the solidification point of the polymer, and chemically reacted with an amino-s-triazine until fine particles of insoluble cyanurate-amino-s-triazine adduct are formed and evenly distributed throughout the fluid thermoplastic polymer. The polymer containing the adduct particles is solidified until the particles are bound together by a matrix of solid thermoplastic polymer. The matrix bound adduct is then comminuted until thermoplastic fire retardant concentrate particles are formed which exhibit improved fire retarding properties and may be readily melt blended into other thermoplastic polymers to impart fire retardancy thereto.

It was found that the fluid thermoplastic polymers effective in this method are stable polymers which can be reasonably heated to their melting points and cooled through solidification points without physical or chemical degradation. Polymers used as melts were effective when they exhibited solidification points between 100° C. and 240° C. Polymers with solidification points much less than 110° C. did not form concentrate granules with the required physical integrity and tended to undesirably soften during handling, while polymers with solidification points higher than 240° C. were difficult to melt blend with other thermoplastics although they formed high integrity particles of fire retardant concentrate.

A range of cyanurate-amino-s-triazine concentrations may be used in the practice of the present invention, however, it is most effective when the water insoluble fine particles of cyanurate-amino-s-triazine amount to between 65 and 95 percent and the thermoplastic polymer amounts to between 5 and 35 percent of the fire retardant concentrate particles. Although concentrates containing less than 65 percent adduct are effective and physically strong and miscible with other thermoplastic, the large use amounts required make them less practical and economical. Concentrations higher than 95 percent cause less than desired strength, thermoplasticy, and miscibility in the concentrate particles.

Base soluble cyanurates found particularly suitable for the use in the present method include isocyanuric acid, potassium isocyanurate, sodium isocyanurate, lithium isocyanurate, alkyl isocyanurate, aryl isocyanurate, cyanuric acid, and chlorocyanuric acid.

Suitable amino-s-triazines were found to include melamine, melamine phosphate, ammeline, ammelide, methylol melamine, melamine maleate, melamine terephthalate, and caprolactam melamine complex.

For the method of the present invention to operate effectively, it was found essential that base soluble cyanurates be employed and that sufficient base be used to solubulize the cyanurate. Several bases were found to impart sufficient solubility and to be effective in the method. The effective bases included sodium hydroxide, potassium hydroxide, magnesium hydroxide, lithium hydroxide, calcium hydroxide, tetrasodium pyrophosphate, ammonium hydroxide, and sodium carbonate.

The admixing and reacting of the base, base soluble cyanurate, amino-s-triazine, and fluid thermoplastic polymer, and the solidification and comminuting of the matrix bound adduct formed, may be effectively achieved by blending in and extruding through a screw blender and die, at a temperature exceeding the solidification point of the fluid thermoplastic polymer, to form strans which are cooled until solidification occurs, and then cut into uniform particles.

Conventional fluid thermoplastic polymers may be used in the present method so long as they are physically and thermally stable and exhibit solidification points within the desired range. Polymers found to be particularly effective which are economically commercially available include: nylon, polyolefin, polyvinylidene chloride, polyester, polystyrene, polyacrylonitrile, polycarbonate, and polybutadiene.

The fluid form of the thermoplastic polymers may be achieved by heat melting, heat softening the polymers to flowability, or it may be obtained in the form of an aqueous dispersion of the polymer. When an aqueous dispersion is used, the solidification point or temperature is usually lower than that of the polymer alone. The solidification point is a function of the concentration of the thermoplastic polymer dispersed in water, and the intrinsic properties of the polymer, especially its solidification point.

Most effective and preferred operation of the method of the present invention is obtained when the fluid thermoplastic polymer is an aqueous dispersion containing between 20 and 70 percent polymer. When the fluid thermoplastic polymer used is an aqueous dispersion, it is necessary to remove the water from the mixture by evaporating before the matrix bound adduct is ready for use to impart fire retardancy into other thermoplastics by melt blending therewith.

The removal of water is best achieved by heating the mixture at temperatures between 50° and 240° C., at pressures between 0.1 and 2.0 atmospheres absolute, until moisture is reduced to less than 1 percent of the final product.

A still more economical and improved method of the present invention is the preparation of the fire retardant concentrate in the form of granules by combining high concentrations of cyanurate-amino-s-triazine in a low concentration of matrix of thermoplastic polymer. In this variation of the method, the fine particles of insoluble cyanurate-amino-s-triazine adduct evenly distributed in the fluid thermoplastic polymer are converted to granules in the solidifying and comminuting steps by injecting the adduct in the fluid polymer into a granulating device and therein comminuting and rolling the injected fluid along a cooling surface until it solidifies into granules.

The particulate thermoplastic fire retardant concentrate prepared by the present invention is unique in that the composition cannot be prepared by prior art methods. The uniqueness of the composition may be seen by the ease in which it may be incorporated into other thermoplastics to make them resistant to burning. In a regular continuous twin screw melt blending device, blending of the present composition containing 70 percent, or more, cyanurate-amino-s-triazine adduct with other thermoplastic polymers was readily and quickly achieved without troublesome wear on the device. On the other hand, powders of triazines, cyanurate-amino-s-triazine adducts, and similar fire retardants, took longer blend times, larger blenders, frequently more than one pass through the blender, and caused substantial wear on the blender.

The particulate thermoplastic fire retardant concentrate composition of the present invention may be used to impart fire retardancy to more of the thermoplastic polymer contained in the composition, or to other thermoplastic polymers so long as the materials are melt blendable. Nylon containing concentrate compositions, for example, may be used with polypropylene, polyester, polycarbonate, polyurethane, and other thermoplastic polymers to impart fire retardancy thereto.

The method of the present invention, as stated heretofore, may be used with numerous polymers, under a range of acceptable conditions. However, the method may be improved still further, particularly from the standpoints of economics and commercial utility. In this improved method, isocyanuric acid is admixed with a strong base amounting to between 5 and 25 percent of the isocyanuric acid to solubulize the isocyanuric acid in molten thermoplastic nylon at a temperature exceeding the solidification point of nylon by between 5° and 70° C. If the temperature is less than 5° C. above the solidification point, mixing and reacting are difficult, and 70° C. above the solidification point causes nylon degradation to become a problem.

Melamine is blended and reacted with the solubulized isocyanuric acid in a mol ratio preferably between 1.0 and 1.1, at a temperature between 100° C. and 250° C., until fine particles of insoluble melamine cyanurate adduct are formed, amounting to between 65 and 95 percent of the fire retardant concentrate, and is evenly distributed throughout the molten nylon polymer.

It was found that the molten polymer could be cooled to a temperature less than the solidification point of the polymer so that the fine particles of the insoluble melamine cyanurate adduct formed are bound together by a matrix of solid nylon polymer.

It was also found that the solidified matrix bound adduct could be put in a form for convenient use for melt blending with other thermoplastic polymers by comminuting into particles until the diameters thereof were between 0.03 and 0.3 inch.

The particulate thermoplastic fire retardant concentrate prepared by the method just described is particularly commercially useful and economical, and yet scientifically effective.

The present method may be modified to fit raw materials and equipment commercially available, and to produce the type thermoplastic polymer to be eventually made fire retardant. A practical method was found for economical and effective use where an aqueous dispersion of thermoplastic polymer could be used. In this method, isocyanuric acid and alkali metal hydroxide, amounting to between 10 and 20 percent of the isocyanuric acid, are mixed with an aqueous dispersion of thermoplastic polymer containing between 10 and 60 percent thermoplastic polymer and the remainder essentially water. The isocyanuric acid is solubulized in the dispersion.

With this solubulized isocyanuric acid, is mixed and reacted melamine, until fine particles of insoluble melamine cyanurate adduct are formed, which amounts to between 70 and 85 percent of the fire retardant concentrate, and evenly distributed throughout the aqueous thermoplastic polymer.

To bind the fire retardant, water is evaporated from the aqueous dispersion at temperatures between 50° and 160° C. until the thermoplastic polymer solidifies and the fine particles of insoluble melamine cyanurate adduct are bound together by a matrix of solid thermoplastic polymer and moisture content is less than 1 percent.

To put the particulate thermoplastic fire retardant concentrate in the form for convenient use, the matrix bound adduct is best comminuted.

It was found that is was not necessary to initially completely dissolve the cyanurates with base for the present invention to be operative. As long as base is available to dissolve appreciable cyanurate, this cyanurate is quickly reacted with amino-s-triazine to form quite insoluble adducts. This reaction frees the base to solubulize more cyanurate for reaction. This continues until all of the cyanurate is converted to the adduct, with all of the cyanurate having passed through the base solubulized compound stage.

It was found that from an operating standpoint the method was very economically carried out where the aqueous dispersion of thermoplastic polymer comprised between 10 and 40 percent polyalkene polymer dispersed in water. The polyalkene based particulate thermoplastic fire retardant concentrate was found to be homogeneous, effective, and economical to prepare. It was surprising that this concentrate could be effectively used with other higher melting polymers, such as nylon.

The method of this invention allows the improved preparation of fire retardant concentrates containing higher than heretofore possible concentrations of active fire retarding cyanurate-amino-s-triazine adducts, and it also provides an improved method of imparting fire retardancy to other thermoplastic polymers. It was found that fire retardancy could be imparted to other thermoplastic polymers and plastics by melt blending 1 part of the improved particulate thermoplastic fire retardant concentrate of this invention with between 1 and 20 parts of the other thermoplastic polymers and plastics. The relative amounts of the concentrate required varies to correspond to the flammability of the other thermoplastics and the degree of final fire resistance required. The physical blending process is readily achieved with all ratios. At dilution of more than 20 to 1, the effect on fire retardancy becomes undesirably small, and at dilutions of 1 and less, the physical properties of the fire retardant thermoplastic products are usually less than desired.

Thus, the method of the invention can be used to prepare fire retardant polymers and plastics by proceeding through concentrates. In a practical and economic form of this method, isocyanuric acid and base sufficient to solubulize the isocyanuric acid are mixed with a fluid thermoplastic polymer at a temperature exceeding the solidification point of the polymer.

Then melamine is reacted with the solubulized isocyanuric acid until fine particles of insoluble melamine cyanurate adduct are formed and evenly distributed throughout the fluid thermoplastic polymer. The fluid thermoplastic polymer and adduct are solidified by cooling to a temperature less than the solidification point of the thermoplastic polymer until the fine particles of insoluble melamine cyanurate adduct are bound together by a matrix of solid thermoplastic polymer.

The solidified matrix bound adduct is comminuted until particulate thermoplastic fire retardant concentrate is formed.

The final fire retardant polymers are prepared by melting and mixing 1 part of the particulate fire retardant concentrate with between 1 and 20 parts of thermoplastic polymers until the melamine isocyanurate is evenly distributed throughout the thermoplastic polymers.

EXAMPLE 1

Example 1 demonstrates the method of preparing the soluble cyanurate based fire retardant concentrate of the present invention.

The device used for the preparation of the solubulized cyanurate was a steam jacketed enclosed conventional stainless steel kettle equipped with a standard low speed, center hung, agitator, with an internal thermocouple well, top opening batch addition port, and a discharge port at the center of the bottom of the kettle. The volume of the kettle was 100 liters.

To the kettle was added the materials listed as follows:

| Materials | lbs |
|---|---|
| Isocyanuric acid, powder, mean particle size ca. 500 microns | 22.0 |
| Caustic Soda, 50% NaOH | 2.0 |
| Nylon, blend, low melting, mp 106° C. | 14.0 |
| TOTAL | 38.0 |

Steam was applied to the jacket, the agitator was actuated at low speed, and the mixture was heated to 135° C. The isocyanuric acid was solubulized by the caustic soda into a thin opaque fluid. While maintaining agitation and a temperature of 135° C., melamine powder amounting to 22 pounds, having a mean particle size of 25 microns, was added through the top addition port. The opaque fluid became very white in color and thickened as the chemical reaction to form the very insoluble melamine cyanurate adduct took place. The agitation was continued at 135° C. until the reaction was completed and the product adduct was evenly distributed throughout the thick fluid.

The thick fluid thermoplastic polymer was solidified by discharging through the bottom port of the kettle into a shallow stainless steel pan, where it was allowed to cool to ambient temperature, thereby binding the fine particles of insoluble melamine cyanurate adduct together in a matrix of solid thermoplastic nylon polymer.

The solidified matrix bound adduct was broken up into pieces and fed through a Fitzpatrick comminuting mill and screened to a particulate fire retardant concentrate having a diameter size range between 0.05 and 0.20 inches.

EXAMPLE 2

The initial operations in this example were carried out in the same manner and equipment of Example 1. In this example, the thick thermoplastic polymer discharged from the bottom port of the kettle was solidified by pressure discharging as a melt into a 30 mm diameter Berstorff twin screw melt blender. It was discharged therefrom through a die plate producing 2.5 mm diameter strans which were continuously water cooled in a bath, and chopped to produce smooth white cylinders about 2.5 mm by 3.0 mm long. Moisture of the product was 0.2 percent and the fire retardant concentrate was ready for use.

EXAMPLE 3

This example demonstrates the method of preparing the soluble cyanurate based cyanurate -amino-s-triazine adduct fire retardant concentrate of the present invention using an aqueous dispersion of thermoplastic polymer as the reaction medium to form the adduct and as the matrix forming thermoplastic polymer.

The device used for this preparation consisted of a steam jacketed horizontal cylinder having a volume of 130 liters. The cylinder was 70 cm long and was fitted with 2 plows rotating tangentally at 500 rpm to the inside wall of the cylinder and shaped to throw the contents toward the center of the cylinder.

The cylinder was also fitted with a chopper operating perpendicularly to the internal wall of the cylinder at a speed of 3000 rpm describing a chopping circle of 15 centimeters on a shaft entering the cylinder at the 3 o'clock position. The chopper consisted of 4 sharp blades attached to the shaft as close to the inner wall of the cylinder as practical. The cylinder was equipped with a vacuum stack, two fluid injection nozzles, and solids addition port all on top of the horizontal cylinder. The center bottom side of the cylinder was equipped with a quick opening solids discharge port.

To the cylinder was added through the solids addition port the materials listed as follows:

| Materials | lbs |
|---|---|
| Polyethylene aqueous dispersion, 30% polyethylene | 25.0 |
| Caustic soda, 50% NaOH | 0.5 |
| Isocyanuric acid powder, mean particle size ca. 500 microns | 11.0 |

Steam was then applied to the jacket with the plows and the choppers operating. The temperature of the mixture was brought to 65° C. when the mixture became a very thin opaque fluid with a pH of about 11.

While maintaining agitation and temperature in the cylinder melamine powder, amounting to 11.0 pounds and having a mean particle diameter of 40 microns and assaying 99 percent, was added. As soon as the melamine addition was made, the cyanurate-amino-s-triazine adduct was formed by the chemical reaction of the base solubulized isocyanuric acid and the melamine. The adduct, in extremely fine and unseparatable condition, was formed in the polyethylene dispersion making it viscous but still fluid.

Operation of the plows and choppers was continued while steam pressure on the jacket was increased and vacuum was applied to the cylinder to produce an internal pressure of 100 mm Hg absolute in the cylinder while the temperature within the cylinder ingredients increased to 85° C. After 20 minutes, the moisture had been almost completely removed and the cylinder contents had been shaped into semi-spherical granules by rolling along the smooth metal surface of the cylinder wall. Operation of the chopper prevented undue growth of the granules. The vacuum was terminated and the granules were discharged from the bottom side opening of the horizontal cylinder.

The solidified granules, having a diameter range between 0.03 and 0.27 inch, were composed of melamine cyanurate adduct homogeneously distributed throughout a solid polyethylene matrix. Analysis showed the granules to contain 2.1 percent water, and a mixture of 1 part of the granules with 10 parts water exhibited a pH of 7.8.

The granules were dried to a moisture content of 0.06 percent in a fluid bed dryer using an air discharge temperature of 91° C.

EXAMPLE 4

This example demonstrates the utility of the fire retardant concentrates of the present invention for blending with other thermoplastic polymers and plastics in a simple method to provide fire retardancy thereto.

Granular product from Example 3 amounted to 30 pounds and had the analysis listed as follows:

| Component | Wt % |
|---|---|
| Melamine Cyanurate Adduct | 73.33 |
| Polyethylene Polymer | 25.00 |
| Sodium Compound, as Na | 0.47 |
| Moisture | 0.06 |
| Other Inerts | 1.14 |
| TOTAL | 100.00 |

Nylon-6, containing no fire retarding additives, in the form of 2.5 mm by 2.5 mm extruded pieces, was dry blended in a batch V-Blender with the fire retardant concentrate of Example 3. The nylon-6 amounted to 243 pounds and the concentrate of Example 3 amounted to 30 pounds. The mixture was continuously fed to a 30 mm Berstorff Twin Screw Melt Blender at a rate of 240 pounds per hour using a length to diameter ration of 33 to 1, 175 rpm, and a temperature range in the blender from 218 to 60° C.

The melt fluid was discharged through dies and solidified by stran cooling via brief water content. The solid stans were chopped continuously to produce strong, lustrous particles 2.5 mm diameter and 2.5 mm long composed as follows:

| Component | Wt % |
|---|---|
| Melamine Cyanurate Adduct | 8.06 |
| Polyethylene Polymer | 2.75 |
| Sodium | 0.05 |
| Inerts | 0.12 |
| Nylon-6 | 89.02 |
| TOTAL | 100.00 |

The physical properties, including the tensile strength, 'elongation, the Izod Notch Test, and flexibility modulus of the fire retardant compounded nylon-6 were substantially the same as the original nylon-6.

EXAMPLE 6

This example demonstrates that thermoplastic polymers and plastics prepared by melt blending regular thermoplastic polymers with the fire retardant thermoplastic concentrates of this invention are superior in their resistance to burning.

The product of Example 5 was tested by the Underwriters Laboratory Method 94 and gave a V-O non-burning rating. The LOI (limiting oxygen index) was a very high 36.0 compared to the less favorable LOI of 31.1 obtained with same amount of melamine cyanurate blended directly into nylon-6.

I claim:

1. An improved method of preparing particulate, cyanurate based, fire retardant concentrates, for providing fire retardancy to thermoplastic polymers and plastics by melt blending therewith, the improved method comprising:
   (a) admixing a base soluble cyanurate and sufficient base to solubulize the cyanurate, with a fluid thermoplastic polymer at a temperature exceeding the solidification point of the polymer;
   (b) chemically reacting an amino-s-triazine with the solubulized cyanurate until fine particles of insoluble cyanurate-amino-s-triazine adduct are formed and evenly distributed in the fluid thermoplastic polymer;
   (c) solidifying the fluid thermoplastic polymer and adduct by cooling to a temperature less than the solidification point of the thermoplastic polymer until the fine particles of insoluble cyanurate-amino-s-triazine adduct are bound together by a matrix of solid thermoplastic polymer; and (d) comminuting the solidified matrix bound adduct until particulate thermoplastic fire retardant concentrate is formed.

2. The method of claim 1 wherein the fluid thermoplastic polymer is a stable polymer exhibiting a solidification point between 110° and 240° C.

3. The method of claim 1 wherein the water insoluble fine particles of cyanurate-amino-s-triazine adduct amount to between 65 and 95 percent and the thermoplastic polymer amounts to between 5 and 35 percent of the fire retardant concentrate.

4. The method of claim 1 wherein the base soluble cyanurate is selected from the group consisting of isocyanuric acid, potassium isocyanurate, sodium isocyanurate, lithium isocyanurate, alkyl isocyanurate, aryl isocyanurate, cyanuric acid, and chlorocyanuric acid.

5. The method of claim 1 wherein the amino-s-triazine is selected from the group consisting of melamine, melamine phosphate, ammeline, ammelide, methylol melamine, melamine maleate, melamine terephthalate and caprolactam melamine complex.

6. The method of claim 1 wherein the base used to solubulize the cyanurate is selected from the group consisting of sodium hydroxide, potassium hydroxide, magnesium hydroxide, calcium hydroxide, tetrasodium pyrophosphate, tetrapotassium pyrophosphate, ammonium hydroxide, and sodium carbonate.

7. The method of claim 1 wherein the solidifying of the fluid thermoplastic polymer and adduct and the comminuting of the solidified matrix bound adduct is achieved by extruding through a screw blender and die at a temperature exceeding the solidification point of the thermoplastic polymer to form strans which are cooled until solidification occurs, and then cut into uniform particles.

8. The method of claim 1 wherein the fluid thermoplastic polymer is selected from the group consisting of nylon, polyethylene, polyolefin, polyvinylidene chloride, polystyrene, polyacrylonitrile, polycarbonate, and polybutadiene.

9. The method of claim 1 wherein the fluid thermoplastic polymer is an aqueous dispersion containing between 20 and 70 percent polymer.

10. The method of claim 9 wherein the water introduced in the aqueous dispersion is removed from fluid thermoplastic polymer and adduct evaporatingly by heating to a temperature between 50° and 240° C. at an absolute pressure between 0.1 and 2.0 atmospheres until water concentration is lower than 1 percent and the cyanurate-amino-s-triazine adduct is bound together by a matrix of solid thermoplastic polymer.

11. The method of claim 1 wherein the particulate thermoplastic fire retardant concentrates are converted to granules during the solidifying and comminuting by injecting the adduct in the fluid thermoplastic polymer into a granulating device and comminuting and rolling the injected fluid along a surface until it solidifies into granules.

12. An improved method of preparing particulate thermoplastic fire retardant concentrates, for providing fire retardancy to thermoplastic polymers by melt blending therewith, the improved method comprising:
(a) admixing isocyanuric acid and a strong base amounting to between 5 and 25 percent of the isocyanuric acid weight to solubulize the isocyanuric acid, with molten thermoplastic nylon polymer at a temperature exceeding the solidification point of the nylon polymer by between 5° and 70° C.;

(b) admixing and chemically reacting melamine with the solubulized isocyanuric acid at a temperature between 100° and 250° C. until fine particles of insoluble melamine cyanurate adduct are formed, amounting to between 65 and 95 percent of the fire retardant concentrate, and evenly distributed throughout the molten nylon;

(c) solidifying the molten polymer by cooling to a temperature less than the solidification point of the nylon polymer until the fine particles of insoluble melamine cyanurate adduct are bound together by a matrix of solid nylon polymer; and (d) comminuting the solidified matrix bound adduct until 'particulate thermoplastic fire retardant concentrate is formed suitable for melt blending with thermoplastic polymers and exhibiting particle diameters between 0.03 and 0.3 inches.

13. An improved method of preparing particulate thermoplastic fire retardant concentrates for providing fire retardancy to thermoplastic polymers, the improved method comprising:
(a) admixing isocyanuric acid and alkali metal hydroxide amounting to between 10 and 20 percent of the isocyanuric acid weight to solubulize the isocyanuric acid, with an aqueous dispersion of thermoplastic polymer containing between 10 and 60 percent thermoplastic polymer;

(b) admixing and chemically reacting between 1 and 1.1 mols of melamine with 1 mol of the solubulized isocyanuric acid until fine particles of insoluble melamine cyanurate adduct are formed, amounting to between 70 and 85 percent of the fire retardant concentrate, and evenly distributed throughout the aqueous dispersion of thermoplastic polymer;

(c) evaporating water from the aqueous dispersion of thermoplastic polymer at temperatures between 50 and 160° C. until the thermoplastic polymer solidifies and the fine particles of insoluble melamine cyanurate adduct are bound together by a matrix of solid thermoplastic polymer and moisture content is less than 1 percent; and (d) comminuting the solidified matrix bound adduct until particulate thermoplastic fire retardant concentrate is formed.

14. The method of claim 13 wherein the aqueous dispersion of thermoplastic polymer comprises between 10 and 40 percent of polyalkene polymer dispersed in water.

15. An improved method of providing fire retardancy to thermoplastic polymers and plastics by melt blending 1 part of the improved particulate thermoplastic fire retardant concentrate of claim 1 with between 1 and 20 parts of thermoplastic polymers and plastics.

16. An improved method of providing fire retardancy to thermoplastic polymers comprising:
(a) admixing isocyanuric acid and sufficient base to solubulize the isocyanuric acid, with a fluid thermoplastic polymer at a temperature exceeding the solidification point of the polymer;

(b) chemically reacting melamine with the solubulized isocyanuric acid until fine particles of insoluble melamine cyanurate adduct are formed and evenly distributed in the fluid thermoplastic polymer;

(c) solidifying the fluid thermoplastic polymer and adduct by cooling to a temperature less than the solidification point of the thermoplastic polymer until the fine particles of insoluble melamine cyanurate adduct are bound together by a matrix of solid thermoplastic polymer;

(d) comminuting the solidified matrix bound adduct until particulate thermoplastic fire retardant concentrate is formed; and (e) meltingly commingling 1 part of the particulate fire retardant concentrate with between 1 and 20 parts of thermoplastic polymers until the melamine isocyanurate is evenly distributed throughout the thermoplastic polymers.

* * * * *